US012173870B1

(12) United States Patent
Bagsby, II

(10) Patent No.: US 12,173,870 B1
(45) Date of Patent: Dec. 24, 2024

(54) AUTONOMOUS REPLACEMENT OF A LIGHT ON A TOWER

(71) Applicant: Drone Ventures LLC, Bakersfield, CA (US)

(72) Inventor: Michael Bagsby, II, Bakersfield, CA (US)

(73) Assignee: Drone Ventures LLC, Bakersfield, CA (US)

( * ) Notice: Subject to any disclaimer, the term of this patent is extended or adjusted under 35 U.S.C. 154(b) by 0 days.

(21) Appl. No.: 18/608,712

(22) Filed: Mar. 18, 2024

(51) Int. Cl.

| | |
|---|---|
| ***F21V 19/04*** | (2006.01) |
| ***F21V 21/096*** | (2006.01) |
| ***F21V 23/06*** | (2006.01) |
| *F21W 131/10* | (2006.01) |
| *F21Y 115/10* | (2016.01) |

(52) U.S. Cl.
CPC ............ *F21V 19/04* (2013.01); *F21V 21/096* (2013.01); *F21V 23/06* (2013.01); *F21W 2131/10* (2013.01); *F21Y 2115/10* (2016.08)

(58) Field of Classification Search
CPC ........ F21V 19/04; F21V 21/096; F21V 23/06; F21V 2131/10
See application file for complete search history.

(56) References Cited

U.S. PATENT DOCUMENTS

2020/0011487 A1* 1/2020 Creusen ................. F21V 33/00

* cited by examiner

*Primary Examiner* — Sean P Gramling
(74) *Attorney, Agent, or Firm* — Fenwick & West LLP

(57) ABSTRACT

A system for the maintenance of a light on a tower is described. The coupling and decoupling system of a permanent electromagnet automates the maintenance of lights on light towers. The apparatus may include a designed light base, light housing, and drone plate. The designed light base is affixed to a tower and comprises a permanent electromagnet. The light housing includes a light and a base plate that magnetically affixes the light to the light base. The light housing also includes a light top plate that attaches to a drone plate that allows for a drone to couple to and decouple from the light housing in order to replace the light housing.

14 Claims, 7 Drawing Sheets

AUTONOMOUS REPLACEMENT OF A LIGHT ON A TOWER

BACKGROUND

Maintenance of lights on towers requires regular manual inspection and replacement. Current manual methods of maintaining and replacing lights on towers are costly and present safety hazards. Accessibility to the lights on towers are limited and thus require specialized equipment or personnel to maintain light systems on towers. Currently, lights are installed onto towers through bolting lighting fixtures onto light bases. These light systems are replaced by manually affixing and removing lighting fixtures from the light bases. However, these methods tend to require manual maintenance of installing and replacing lights which present accessibility and compliance issues. Therefore, conventional systems of affixing light fixtures onto inaccessible apparatus systems such as towers may be inoperable and inefficient.

Routine inspections are conducted to ensure that towers remain operable and reliable. Towers are often deployed in remote or rugged environments, making manual replacement and maintenance of lights on towers difficult. Manual replacements of lights present additional risks because working at height presents inherent safety risks for maintenance personnel. Moreover, current configuration and manufacturing design of lights and their auxiliary components that affix them to towers result in weight that adds danger to manual replacement and precludes robotic replacement, as the payloads are too heavy for a robot to perform the activity that is manually performed by humans.

SUMMARY

The proposed system utilizes a robot (e.g., an Unmanned Aerial Vehicle (UAV)) and a coupling and decoupling system of a permanent electromagnet to automate the maintenance of lights on light towers, to eliminate the risks outlined above. A designed light base, light housing, and drone plate together substantially reduce the weight of a payload, thereby enabling a robot to carry and replace the payload. The coupling and decoupling mechanism safely affixes the payload to the top of the tower and releases it in a manner that prevents a possibility of the light falling, thereby preventing safety hazards to pedestrians and property below the tower.

In some embodiments, a light base is affixed to a tower that acts as an interface between the tower and the light. The light base comprises a permanent electromagnet that is used to releasably couple the light base to a light housing. The permanent electromagnet is a type of electromagnet that may maintain magnetic properties without the need for an external power source for any purpose other than to demagnetize the permanent electromagnet. The light housing may include a light and a base plate that magnetically affixes the light to the light base. The light housing also comprises of a light top plate that attaches to a plate that allows for a robot having a magnetic plate to couple to and decouple from the light housing in order to replace the light housing.

DETAILED DESCRIPTION

Figure 1:
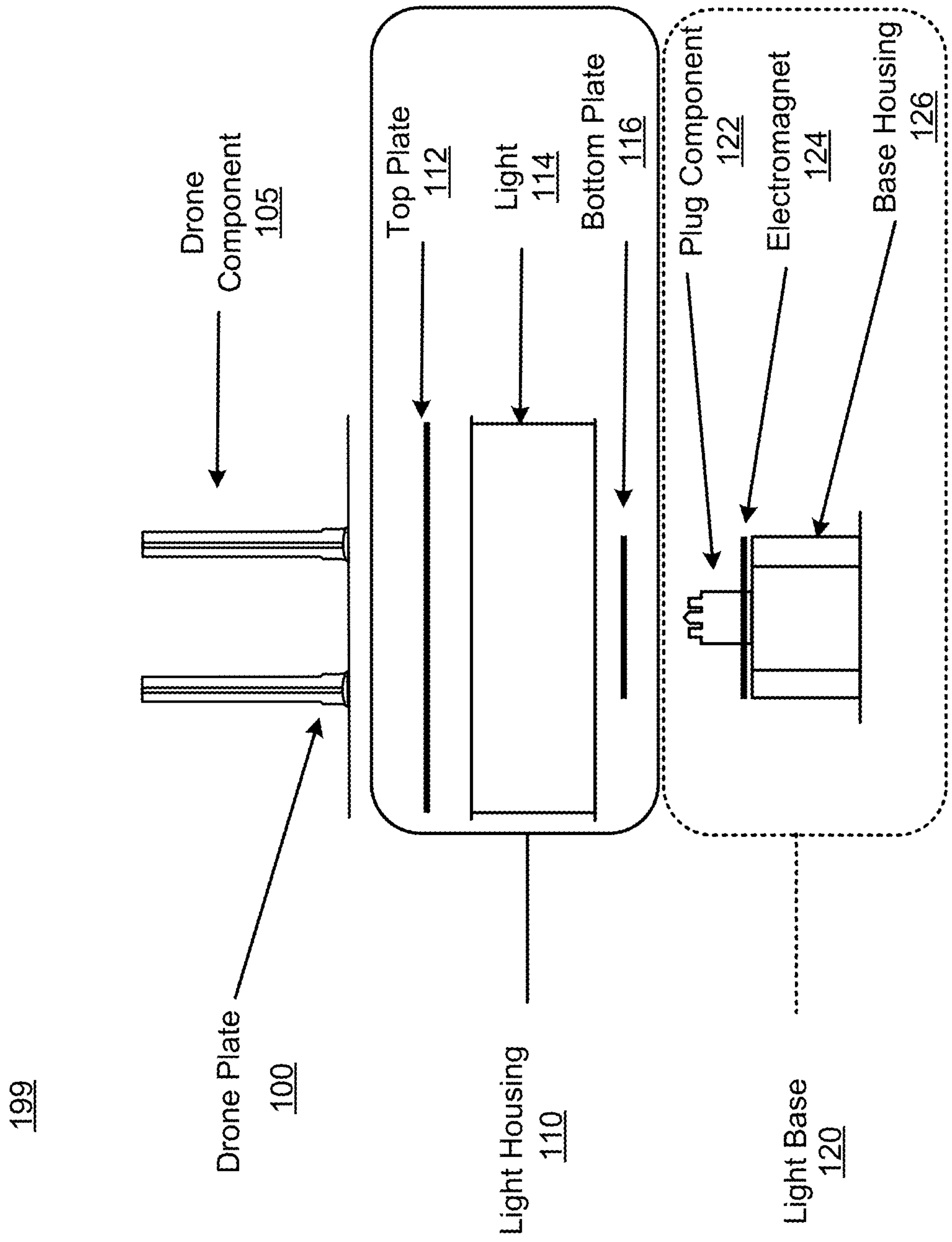
FIG. 1 illustrates an example of an apparatus for coupling and de-coupling a light from a tower.

FIG. 1 illustrates an overview of the coupling and decoupling a light from a tower, in accordance with some embodiments. Alternative embodiments of the coupling and decoupling system may include more, fewer, or different components from those illustrated in FIG. 1.

As depicted in FIG. 1, system 199 includes a drone carrying a drone plate 100, a light housing 110, and a light base 120. The drone is typically described herein as a UAV; however, this is merely for convenience, and any robot capable of coupling to, carrying away, and otherwise replacing a light on a tower is included wherever a drone is mentioned. For example, a robot that climbs a tower to perform replacement is within the scope of a drone, as is any other fully-automatic, partially-automatic, or fully remote-controlled robot that can perform these functionalities. Light housing 110 includes a light as well as plates that operably couple the light to the tower and/or to the drone. Light base 120 may be affixed to the tower and operably couples the light housing 110 to the tower. Further details of each of these components is described below.

Light base 120 may be affixed to a tower using any known mechanism, such as by welding, bolts, screws, or any other fashion that mounts light base 120 in a way that it will not fall from the tower or otherwise move without intervention by human being. Light base 120 includes base housing 126, electromagnet 124, and plug component 122. Base housing 126 houses one or more of circuitry, printed circuit boards (PCB), and any other electrical and hardware components required to operate the functionality of system 199. Base housing 126 may act to shield these components from weather and may be directly or indirectly affixed to the tower. Base housing 126 may include wiring or other conductivity to one or more components of the tower that enables power to operate the electromagnet, the light, or any other electrical feature. Additionally or alternatively (e.g., as a standalone or backup power source), base housing 126 may house a battery supply that can supply electricity to the light, the electromagnet, or any other feature of system 199.

Electromagnet 124 may be within or outside of the base housing. Electromagnet 124 may be operably coupled to the base housing (e.g., by welding, screws, bolts, or any other manner). Electromagnet 124 may be operably coupled to a power supply, be it one of the tower, the base housing, or any other power supply. In an embodiment, electromagnet 124 may be a permanent electromagnet. The term "permanent electromagnet," as used herein, may refer to an electromagnet that has a magnetic property so long as power is not supplied to the electromagnet. Where power is supplied to the electromagnet, the magnetic property may be partially or fully neutralized. For example, a magnet may be surrounded by electronic components that, when powered, provide a reverse magnetic force that partially or completely neutralizes the magnetic force of the magnet. Electromagnet 124 is used to affix light housing 110 to light base 120. Advantageously, where electromagnet 124 is a permanent electromagnet, electromagnet 124 need not draw power to affix light housing 110 to light base 120, and instead need only draw power to release light housing 110 from light base 120.

The light base 120 may be coupled to the light housing 110 via a plug component 122 such that the light housing 124 is connected to the light 114. The electromagnet 124 may also be powered to a signal received through a plug. The plug may include a plurality of wires, each performing a different function. For example, one or more wires may be dedicated to power supply of individual components, signaling (e.g., providing instructions to light 114 to actuate in a specified manner (e.g., displaying a certain color, blinking on a certain cadence, using a certain brightness, etc.), powering the permanent electromagnet, communicating with a drone (e.g., via a short-range link when the drone is near), etc. Plug component 122 is depicted as a male plug, but may be designed as a female plug where a male plug is included as part of light housing 110 to adjoin to light base 120.

The light housing 110 system includes a top plate 112 that is coupled to a light 114, and a bottom plate 116. The light housing 110 is coupled to a drone plate 100.

In one embodiment, the coupling and decoupling apparatus on a tower includes a light housing 110 that is removable from light base 120 by the magnetic force of the drone plate 100. The light housing 110 comprises a top plate 112 that is magnetic. The top plate 112 is affixed to the light and is attachable to drone plate 100. The light housing 110 comprises a bottom plate affixed to a bottom of the light, which allows for the bottom plate to have a magnetic property that causes the bottom plate to affix to the light base 120. The light 114 may be a LED (Light Emitting Diode). Additionally, the light housing 110 accommodates, as depicted, the female piece of the connector to the light base 120. The light housing 110 may be a waterproof encasing comprising of a capability to house the light 114 from inclement weather. The permanent electromagnet 124 magnetically connects with the bottom plate 116.

Drone plate 100 may be a magnetic surface that is permanently or removably attached to drone component 105. Drone plate 100 may be a permanent electromagnet that is activatable or that can be deactivated by application of power in the same manner as electromagnet 124. While depicted as a plate, any magnetic surface that can operably couple to top plate 112 and be carried by drone component 105 may be used. This may include non-contiguous components, such as magnets at the bottom of each leg of the drone or separately attached to some or all of the features of drone component 105. The drone component 105 may be a drone's arms, legs, landing pads, etc. The drone component 105 couples onto the drone plate 100 to operably replace and remove the light 114. In some embodiments, the magnetic force of drone plate 100 is weaker than the magnetic force of electromagnet 124. This relative magnetic force disables the drone from carrying away the light housing 110 unless electromagnet 124 is disabled, as electromagnet 124 will be strong enough to prevent the drone from moving the light housing 110 based on its relatively stronger magnetic force.

The relative magnetic force also may enable drone plate 100 to act as a landing feature, where the magnetic force of drone plate 100 may draw in the drone to land at top plate 112 and be affixed given the power of electromagnet 124 holding the light housing 110, and in turn the drone, in place. In some embodiments, a sensor is in place that signals when drone plate 100 has coupled to top plate 112, where, responsive to detecting that this coupling has occurred, the sensor signals to light base 120 the coupling. The light base 120 may, responsively, activate a power supply to electromagnet 124 to release light housing 110 and allow drone the drone to carry away the light housing 110 for replacement. A sensor may signal to light base 120 that light housing 110 has been carried away, where responsive to receiving this sensor, light base 120 may disable the power to electromagnet 124, enabling electromagnet 124 to thereby have a magnetic force and to accept a new light housing. In other embodiments, powering and depowering electromagnet 124 may occur manually through use of a switch.

In some embodiments, the drone component 105 may hold a replacement light housing 110 within which there is a new light used to replace light 114. A drone may lower light housing 110 onto light base 120, which couples to the new light housing using the electric force of electromagnet 124. The drone is able to fly away given that the magnetic force of the drone plate 110 is relatively weaker than that of electromagnet 124, causing the drone to release from the light housing based on its propulsion away from the tower.

In some embodiments, light base 120 has a sensor that detects a health condition of light 114. For example, light 114 may no longer have any or less than a threshold luminance, of a certain age that it is likely to fail, or any other health condition. The sensor may responsively signal for a drone to automatically perform replacement of light housing 110 with a new light housing 110 upon detecting such a condition. The drone may operate through manual instruction of a human being or autonomously respond to receiving an instruction.

The term "tower" as used herein may refer to any structure that is designed to provide support, elevation, or prominence, and has a mountable lighting system with the purpose of emitting illumination over an area. As a non-exhaustive list of examples, a tower may be a wind turbine with a lighting system or a telecommunication light tower. The tower may also be a building, such as an air traffic control tower, a skyscraper or component thereof, and so on. Towers may include more than one light, any number of which may be replaceable through the systems and methods discussed herein. The light housing discussed herein may be mounted vertically on the tower, perpendicularly to the tower, or at any other angle. The foregoing description of a light tower has been presented; many modifications and variations are possible while remaining within the principles and teachings of the above description.

Figure 2A:
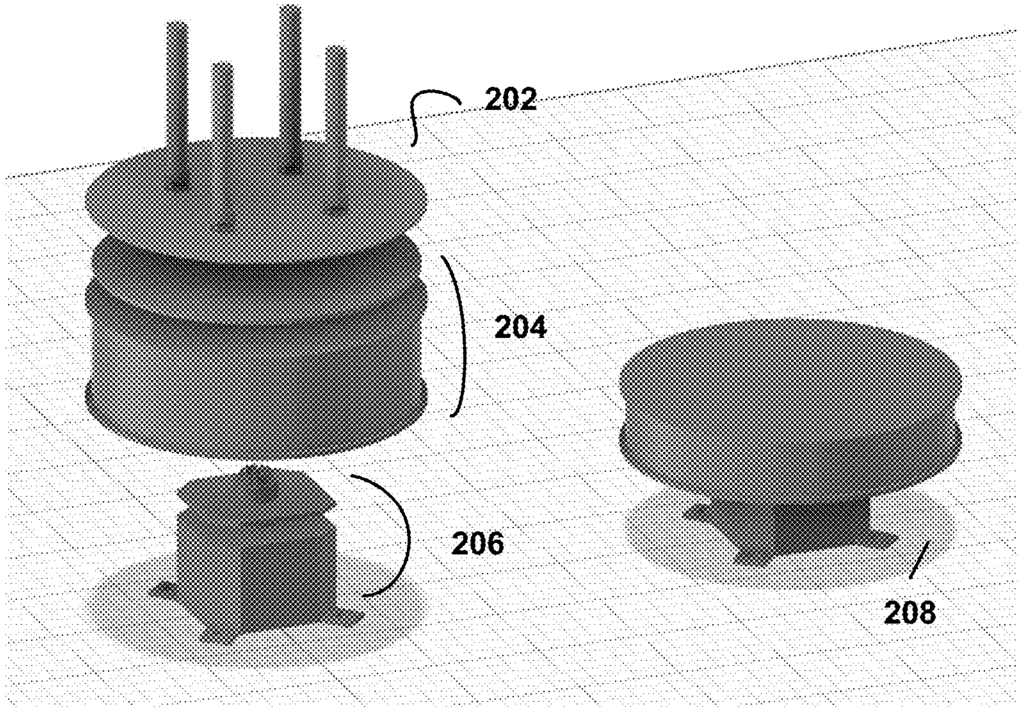
FIG. 2A illustrates an angled view of a first variation of a light base connected to a light housing, in accordance with some embodiments.

FIG. 2A illustrates an angled view of the coupling and decoupling apparatus that focuses on the linkage between the light base and the light apparatus 206, according to some embodiments. FIG. 2A visually depicts an exemplary embodiment of the drone plate 202, the light housing component 204, and the light base 206. The figure shows an example configuration for a variation of a light base 206. The drone plate 202 is a circular metal plate with drone components for landing the drone. The light housing component 204 is also circular and covering the light. The light base 206 comprises of a variation of the plug component for the light housing component 204. The light base 206 includes a variation of the base with a set of legs surrounding the light base. Another view of the light apparatus 208 describes an embodiment where the light housing component 204 attaches to the light base 206.

Figure 2B:
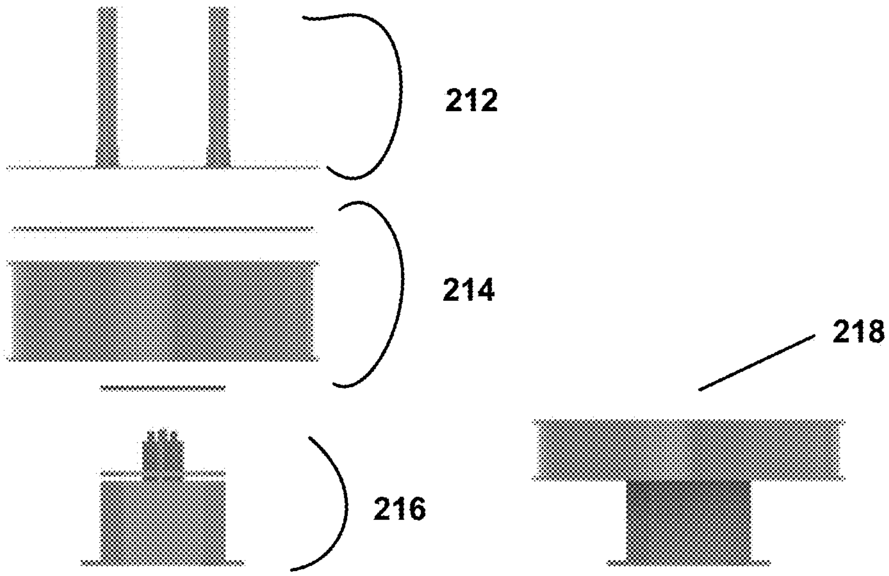
FIG. 2B illustrates a side view of the first variation of the light base connected to the light housing, in accordance with some embodiments.

FIG. 2B illustrates a front view of the coupling and decoupling apparatus, according to some embodiments. In FIG. 2B, the coupling and decoupling between the main components of the coupling and decoupling apparatus illustrated. The main components: the drone plate 212, the light housing component 214, and the light base 216 are depicted. The light base 216 is coupled to the light housing component 214 and shown in 218. FIG. 2B presents a side view of the light base and the housing component coupled together 218 such that the light base 216 with the plug component connects to the light in the light housing component 214.

Figure 3:
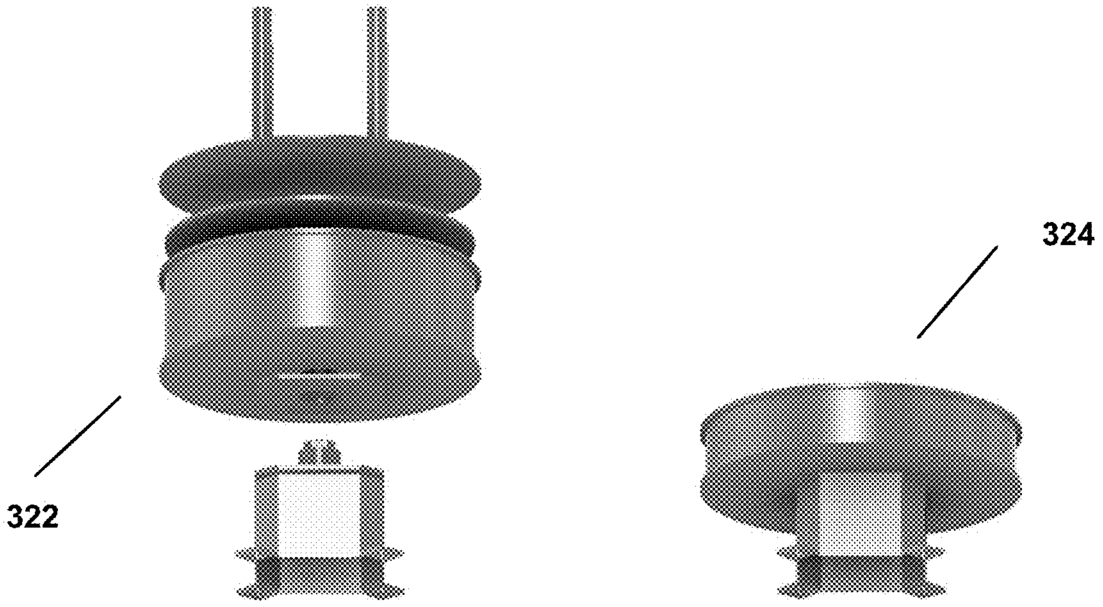
FIG. 3 is an angled view of the first variation of the light base while connecting to a light plug, in accordance with some embodiments.

FIG. 3 is the angled view of the coupling between the light housing and the variation of the light base. The first angled view 322 describes an angled view of the light apparatus with the first variation of the light base. The engagement between the female and male connection systems within the coupling and decoupling apparatus 324 is in a side view and illustrates how the light apparatus connects.

Figure 4:
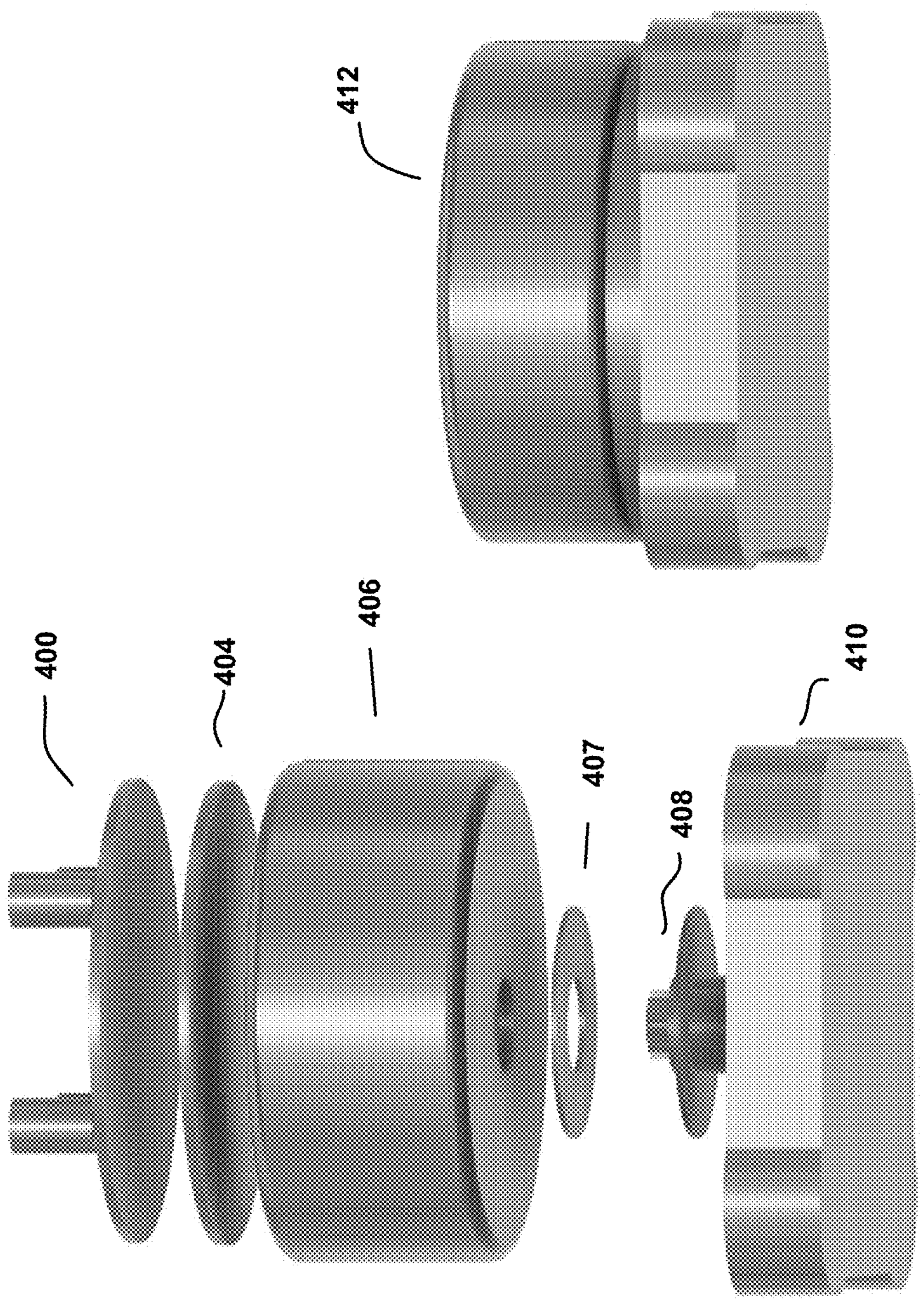
FIG. 4 is a front view of the light apparatus with a second variation of the light housing, in accordance with some embodiments.

FIG. 4 is an angled view of the coupling and decoupling apparatus for another variation of the light base and light housing models, according to some embodiments. In FIG. 4, the plug component 408 may be a different model from the system in FIG. 1. The variation of the system illustrated in FIG. 4 may be in the same configuration as the system illustrated in FIG. 2A. The drone plate 400 is a circular plate in which the drone components may be a different variation than that depicted in FIG. 2A. The top plate 404 may connect to the light housing 406. The light housing 406 is another variation of a light housing for operably housing a light. The bottom plate 407 connects with the light housing 406 such that the bottom plate magnetically connects between the two. The plug component 408 connects with the light housing 406, as depicted in an angled view 412. The light base 410 is operably coupled to the light 406. FIG. 4 is another variation of the light base 410 that does not have legs supporting the base.

Figure 5:
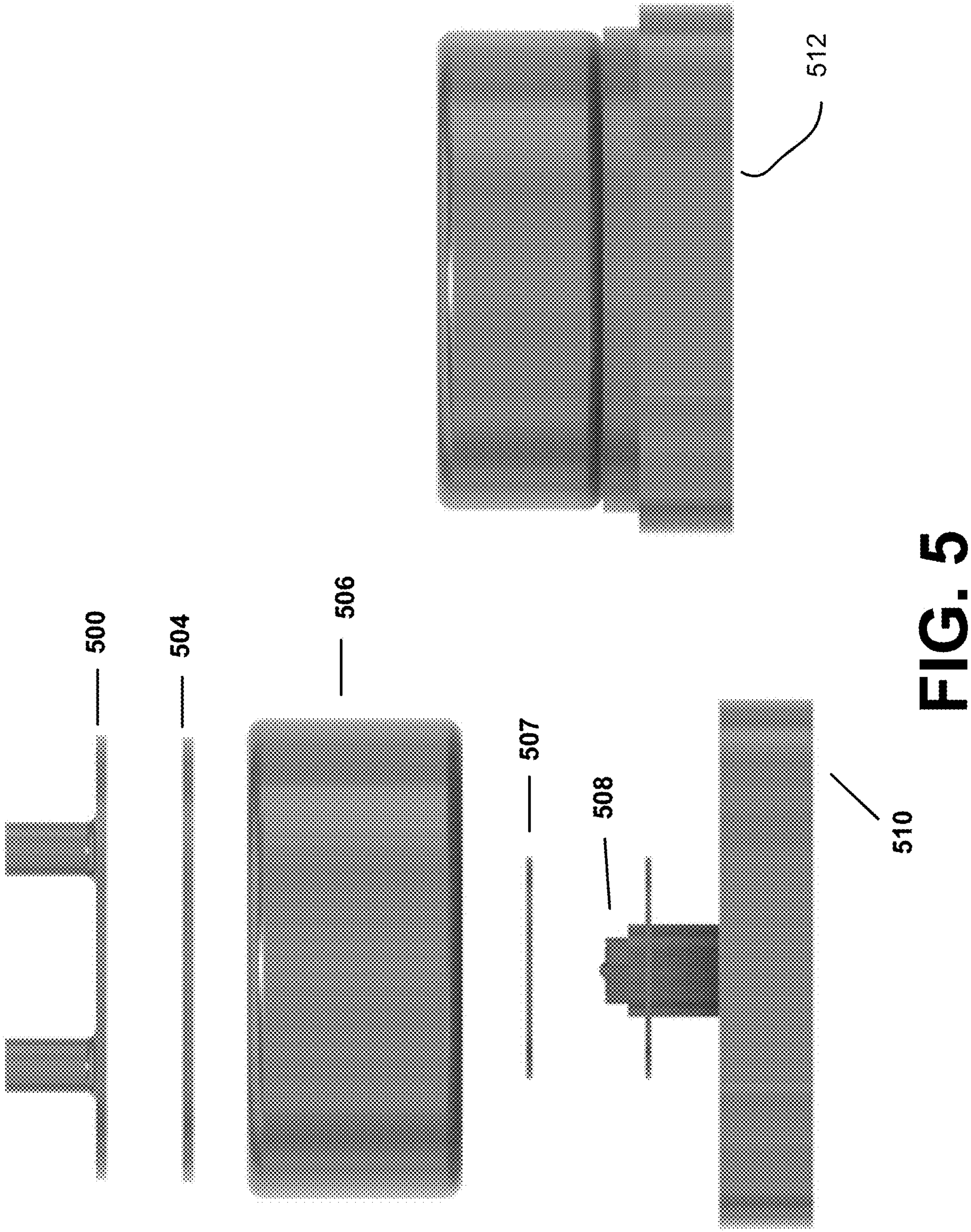
FIG. 5 is a similar view of the second variation of the light housing system to while connecting the light base to the light housing system.

FIG. 5 is a similar view of the variation of the coupling and decoupling apparatus system to FIG. 4, according to some embodiments. However, in FIG. 5, the configuration system between the light housing 506 and the light base 510 is illustrated. The front view of the light apparatus depicts a drone plate 500, a top plate 504 connecting the light housing 506, and the drone plate 500. The light housing 506 connects between the bottom plate 507 and the second variation of the plug component 508 which connects the light base 510. The improved light apparatus system illustrated in FIG. 5 may be in the same configuration as the system illustrated in FIG. 3.

Figure 6:
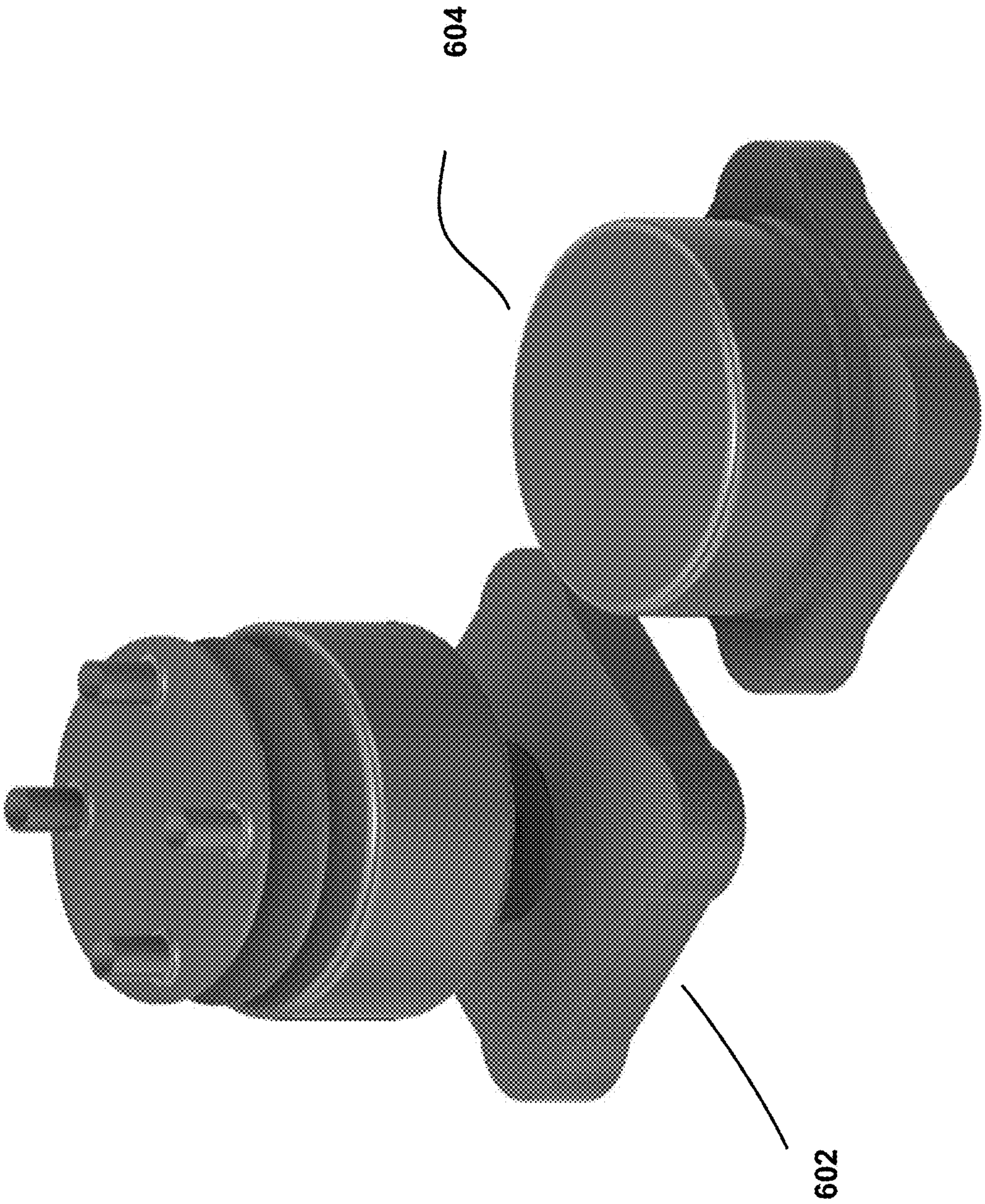
FIG. 6 is an angled view of the second variation of the light apparatus system, according to some embodiments.

FIG. 6 is an angled view of the variation of the coupling and decoupling apparatus system to FIG. 4, according to some embodiments. The system to the left of the drawing 602 is an angled overhead view of the coupling apparatus such that the apparatus. The system to the right 604 illustrates when the coupling apparatus is coupled between one another. The system illustrated in FIG. 6 may be in the same configuration as the system illustrated in FIGS. 2A and 4.

The exemplary embodiments in FIGS. 2-3, and then FIGS. 4-6, show optional geometries that may be used for one or more light types. However, the systems and methods disclosed herein are generalizable to any geometries and any light type. Where components are used (e.g., magnetic plates), any equivalent component may instead be used (e.g., disjoint magnetic pads, rather than one cohesive plate) to achieve the functionalities disclosed herein.

Figure 7:
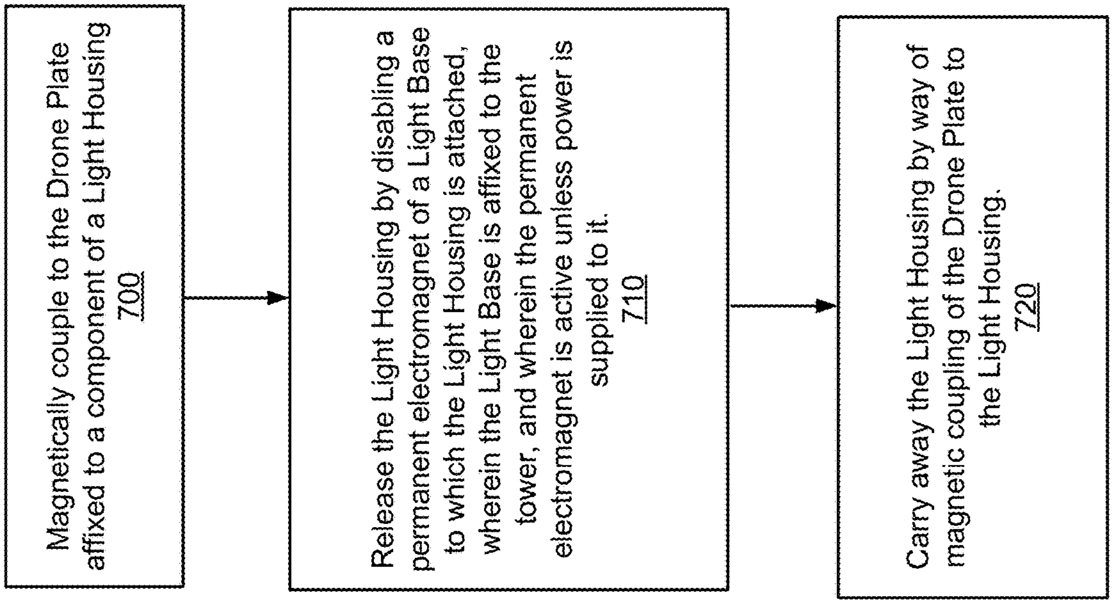
FIG. 7 is a flowchart illustrating an example method of a drone system interacting with the light apparatus system, in accordance with some embodiments.

FIG. 7 is a flowchart illustrating an example for operating a drone to maintain the light with the light apparatus system, in accordance with some embodiments. The method may have more, fewer, or different steps from those illustrated in FIG. 7, and may be performed in a different order from that illustrated in FIG. 7. The drone magnetically couples 700 to the drone plate affixed to a component of a light housing. The drone releases 710 the light housing by disabling a permanent electromagnet of a light base to which the light housing is attached, wherein the light base is affixed to the tower, and wherein the permanent electromagnet is active unless power is supplied to it. The drone carries away 720 the light housing by way of magnetic coupling of the drone plate to the light housing (where replacement may occur using any mechanism described in the foregoing).

Additional Considerations

Some embodiments may be described using the expression "coupled" or "operably coupled" along with their derivatives. The terms "coupled" or "operably coupled" are used herein interchangeably to mean that two or more elements are in direct or indirect contact with each other, and thereby co-operate or interact with each other.

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An apparatus for coupling and decoupling a light from a tower, the apparatus comprising:
- a light base affixed to the tower, the light base comprising:
  - a housing for protecting processing components that command operations of the light;
  - a plug component that supplies power and communication between the housing and the light; and
  - a permanent electromagnet that is active unless power is supplied to the permanent electromagnet;
- a light housing, the light housing comprising:
  - the light;
  - a bottom plate affixed to a bottom of the light, the bottom plate having a magnetic property causing the bottom plate to affix to the light base when the permanent electromagnet is active; and
  - a top plate affixed to a top of the light, the top plate being magnetic; and
- a drone plate, the drone plate affixed to a component of a drone and affixing to the light housing by way of a magnetic connection between the drone plate and the top plate.

2. The apparatus of claim 1, wherein the permanent electromagnet is powered from a signal received through the plug component.

3. The apparatus of claim 1, wherein the permanent electromagnet is powered based on a sensor that detects that the drone plate has made contact with the light housing.

4. The apparatus of claim 3, wherein the sensor detects that the light is replaced and responsively stops powering the permanent electromagnet.

5. The apparatus of claim 1, wherein the drone is a UAV (Unsupervised Aerial Vehicle).

6. The apparatus of claim 1, wherein the light comprises a light emitting diode (LED).

7. The apparatus of claim 1, wherein a force of the permanent electromagnet is greater than a magnetic force of the drone plate.

8. The apparatus of claim 7, wherein the light housing is removable by the magnetic force of the drone plate.

9. The apparatus of claim 1, wherein the drone is signaled to automatically perform a replacement of the light with a replacement light based on a detection of a trigger.

10. An method of replacing a light affixed to a tower by a drone, the method comprising:

magnetically coupling a drone plate to a light housing, wherein the drone plate is affixed to a component of the drone, and wherein the light housing comprises: the light;

a bottom plate affixed to a bottom of the light, the bottom plate having a magnetic property causing the bottom plate to affix to a light base when a permanent electromagnet is active; and a top plate affixed to a top of the light, the top plate being magnetic; and releasing the light housing by disabling the permanent electromagnet of the light base to which the light housing is attached, wherein the light base is affixed to the tower and wherein the permanent electromagnet is active unless power is supplied to the permanent electromagnet, wherein the drone carries away the light housing by way of the magnetic coupling of the drone plate to the light housing.

11. The method of claim 10, wherein the drone returns with a replacement light to affix onto the light base.

12. The method of claim 10, wherein the light comprises a light emitting diode (LED).

13. The method of claim 10, wherein the drone is a UAV (Unsupervised Aerial Vehicle).

14. The method of claim 10, wherein the permanent electromagnet is powered based on a sensor that detects that the drone plate has made contact with the light housing.

* * * * *